United States Patent [19] [11] 4,043,784
Reese et al. [45] Aug. 23, 1977

[54] SHAPING GLASS SHEETS

[75] Inventors: Thomas J. Reese, Sarver; Melvin W. Tobin, New Kensington; James R. Mortimer, Natrona Heights, all of Pa.

[73] Assignee: PPG Industries, Inc., Pittsburgh, Pa.

[21] Appl. No.: 701,465

[22] Filed: July 1, 1976

[51] Int. Cl.² ............................................. C03B 23/02
[52] U.S. Cl. ....................................... 65/107; 65/288; 65/291; 65/374 RM
[58] Field of Search ......... 65/107, 288, 291, 374 RM, 65/106

[56] References Cited

U.S. PATENT DOCUMENTS

| | | | |
|---|---|---|---|
| 3,507,639 | 4/1970 | Seymour | 65/106 X |
| 3,973,943 | 8/1976 | Seymour | 65/374 RM X |

*Primary Examiner*—Arthur D. Kellogg
*Attorney, Agent, or Firm*—Dennis G. Millman; Edward I. Mates

[57] ABSTRACT

Shaping glass sheets of soda-lime-silica compositions by gravity sagging into complicated shapes having a portion of convex curvature and another portion of concave curvature requires a continuous shaping surface onto which a supported glass sheet is heated and sags. The present invention provides a method of bending soda-lime-silica glass sheets onto curved molds of a complicated curvature comprising a previously shaped sheet of a glassy composition having a heat capacity approximating that of the soda-lime-silica composition and a lower coefficient of thermal expansion and a higher deformation temperature than those of the soda-lime-silica composition of the glass sheet to be bent. The layer of glassy composition which provides the mold shaping surface is in turn supported on a metal frame of outline configuration conforming in elevation and outline to the shape of the layer of the special glassy composition, and preferably has a minimum thickness at least equal to the glass sheet to be shaped to insure that when the composite mold comprising the shaped outline metal frame and the superimposed shaped layer supporting a glass sheet to be shaped is heated to the deformation temperature of the glass sheet, the layer retains its shape sufficiently to be used as part of the composite mold in subsequent bending operations.

A layer of knit fiber glass composition is held in stretched relation over the upper shaping surface of the layer of special glassy composition to reduce the possibility of surface damage to the shaped glass sheet. Glass sheets shaped on such composite molds by gravity sagging conform closely to the desired complicated shape and also have a desired stress pattern in the marginal edge portion.

6 Claims, No Drawings

SHAPING GLASS SHEETS

BACKGROUND OF THE INVENTION

1. Field of the Invention

The present invention relates to shaping glass sheets of soda-lime-silica composition to complicated curvatures. The term "complicated curvatures" refers to shapes having portions of concave elevation and other portions of convex elevation in a continuous curve. From time to time, automobile stylists request different shapes for the various windows of automobiles and these shapes are sometimes very simple and sometimes very complicated.

Simple shapes are easy to accomplish by the gravity sag method by supporting one or more glass sheets over a ring-type bending mold of metal which conforms in elevation and plan outline to the shape desired near the marginal periphery of the glass. Since glass has a different heat transfer rate compared to metal used in outline or ring-type molds, the glass sheet heats and cools more rapidly than the mold. Consequently, if the marginal edge of the glass extends beyond the outline of the mold, and the glass is heated and cooled sufficiently rapidly so that the difference in heat capacity between the glass and the mold is too great to enable the glass and the mold to come to an equilibrium temperature during a rapid bending and cooling operation desired for mass production purposes, the shaped glass sheet develops a stress pattern at its marginal edge that comprises a compression stress at its marginal edge portion with an accompanying tension stress inward of the margin often with its maximum along a line in the glass that is superimposed on the outline metal mold during the rapid bending and cooling operation. Such stress patterns are desirable provided the compression stress in the marginal edge portion is uninterrupted and the tension stress within the marginal edge portion is controlled. The reason for this desire is that glass is strong when stressed in compression and weak in tension. Thus, if the edge can be stressed in compression, the danger of edge breakage during handling is reduced. The weak glass zone stressed in tension is protected by the marginal edge portion stressed in compression.

When glass sheets are bent to simple curvatures wherein the glass develops a concave contour along one or both of its major dimensions, the glass sheet conforms sufficiently around its marginal edge to enable an operator to have minimum trouble in installing a curved glass window into a curved window opening in which the curved window is to be installed even though the unsupported center portion of the glass may sag during the heating operation is an uncontrolled manner. However, when glass sheets are shaped to complicated curvatures by gravity sag bending, the only way the glass sheet curvature can be controlled to form a complicated shape including a portion having concave elevation and a portion having convex elevation is by heating the supported glass to its deformation temperature and sagging the glass onto a continuous shaping surface that has previously been shaped.

Conventionally, automobile manufacturers submit patterns or dyes showing a shape and outline desired for a curved window in an automobile and a master mold of ceramic material is produced by applying to the patterns supplied by the automobile manufacturer a fence of a flexible board-like material, such as Masonite, surrounding the pattern and casting into the volume formed by the upper surface of the pattern and the Masonite fence a flowing ceramic material that hardens to form a shape complementary to the shape of the surface of the pattern. A typical ceramic material is sold under the trademark PURETAB.

A mold so formed from a castable refractory material is termed a ceramic pan mold and has a high thermal capacity. Even though it is possible to bend glass sheets to conform to the shape of a ceramic pan mold so formed, it is necessary to heat the mold and the supported glass to the glass deformation temperature at a very slow rate of heating, and, after the glass sheet has conformed to the shaping surface of the ceramic pan mold, cool the glass sheet-laden mold very slowly so as to enable both the mold and the glass to maintain a changing temperature that provides a very small temperature difference between the glass sheet and the mold to avoid glass breakage and/or warping from the mold shape. Furthermore, glass sheets shaped and cooled while supported on high heat capacity ceramic pan molds do not have the desired stress pattern that results when glass sheets are shaped by gravity sagging and cooled while supported on outline metal molds that support the shaped glass adjacent to and slightly inward of its marginal periphery.

Normally, glass sheets have been shaped by gravity sagging by heating the sheets to their deformation temperature and sagging them until they conform to the upper shaping surface of an outline or skeleton metal mold of concave elevation. While the marginal portion of glass sheets so shaped conform closely to the shape of the mold, the unsupported center portion sags with only limited control as to its shape. However, as long as the sagged central portion is in the same direction as the shape provided by the concavely shaped metal mold, the customer would accept deviations in shape that incorporate a slight bit of excessive sag. However, when glass sheets are shaped to more complicated shapes involving a shaped portion of convex elevation as well as a shaped portion of concave elevation, it becomes necessary to support the deformable glass over its entire surface on a continuous shaping surface so as to avoid sag in a concave direction where a shape of convex elevation is desired. Since the solid ceramic pan molds of the prior art were usually composed of materials of high heat capacity that required the glass bending operation to be conducted too slowly to constitute efficient use of the glass sheet bending lehrs already in existence, a more efficient manner of providing complicated bends is needed. Furthermore, a large number of bending lehrs of the type suitable for shaping glass sheets by the gravity sag method are in existence and it would constitute a waste of capital assets not to use such bending lehrs for sag bending operations when the need exists to produce parts shaped to such complicated curvatures as those defined herein.

2. Description of the Prior Art

Steel molds of outline configuration have been used for gravity sag bending and even for press bending glass sheets into desired shapes. Samples of outline bending molds used for gravity sagging are typified in U.S. Pat. Nos. 2,608,030 to Jendrisak; 3,137,558 to Oberstar; 3,155,485 to Ritenour et al; 3,230,062 to Leflet, Jr.; 3,265,488 to Ross et al; 3,278,287 to Leflet, Jr. et al and 3,281,231 to McKelvey et al.

Multiple bending of glass sheets of different compositions prior to lamination is shown in U.S. Pat. No. 3,300,351 to Richardson. Simultaneous bending of two pairs of glass sheets and then laminating selected pairs is disclosed in U.S. Pat. No. 2,314,325 to Binkert and U.S. Pat. No. 3,453,161 to Golightly. U.S. Pat. No. 2,314,325 refers to using glass spacer sheets that are bent simultaneously with a pair of glass sheets to be laminated and then discarded.

Glass sheets are also formed by press bending between molds of complemental curvature with fiber glass or other resilient layers of fiber mat material interposed between at least one of the molds between which the glass sheet is shaped and a glass surface, as disclosed in U.S. Pat. Nos. 3,329,494 to Carson et al; 3,523,783 to Clark et al; 3,514,590 to Tank; 3,634,059 to Miller; 3,682,613 to Johnson et al; 3,713,798 to Stilley et al; 3,741,743 and 3,816,089 to Seymour and 3,899,316 to Ehlers. Press bending vertically supported glass sheets requires tongs or other glass supporting elements that complicate the shaping operation. Press bending horizontally supported sheets that are redeposited on conveying mechanisms causes problems of handling sheets that are bent to shapes other than simple curvatures.

In the early days of shaping glass sheets, glass sheets were shaped by gravity sagging into conformity with a metal mold having a central recessed portion such as depicted in U.S. Pat. No. 280,143 to DeVoursney. However, the mass of such molds necessitated too long a time for the glass to be annealed without breaking after it was shaped. U.S. Pat. No. 417,097 to Scott discloses a solid gravity sag mold in which a shaping surface of plaster is coated with a charcoal facing. U.S. Pat. No. 760,959 to Connington and U.S. Pat. No. 833,436 to Borland et al show a mold having a facing surface of plaster of paris.

U.S. Pat. No. 1,519,277 to Taylor discloses heavy cast iron molds of the gravity sag type of concave elevation.

U.S. Pat. No. 2,876,594 to McRoberts and Black shows a gravity sag mold of convex elevation for sagging glass sheets onto a thin metal sheet supported on an outline mold, while U.S. Pat. No. 3,136,619 to McRoberts and Golightly shows a gravity sag mold of convex elevation having a filler of soft refractory material filling a recess enclosed by an outline mold frame that engages the undersurface of a supported glass sheet in spaced relation to a metal shaping surface that supports the soft refractory filler.

In recent years, glass sheets to be laminated into shaped windshields have been bent while supported on outline molds of steel having upper edge surfaces conforming to the shape desired slightly inward of the marginal edge of the glass. Having the shaped glass sag by gravity as a result of heating it to its softening point has provided suitable support around its periphery where the glass shape is especially critical because of the need to match the curvature of the glass with the opening in which the curved window is to be installed. However, when the glass is supported around its margin only, the unsupported central portion of the glass is likely to sag with only limited control and produce an optically distasteful product. It is also desirable in shaping glass to avoid contacting the glass or bringing it into close proximity to the shaping surface of a glass sheet supporting member having a significantly higher heating capacity than that of the glass sheet to be shaped. Using high heat capacity for the supporting member necessitates a long time to cool the glass and its supporting member without causing tension stress that induces glass breakage.

SUMMARY OF THE INVENTION

The present invention provides a method and apparatus for shaping glass sheets to complicated curvatures. In the apparatus aspect of this invention, a glass of soda-lime-silica composition has its lower surface supported by an upper bearing surface of a layer of glassy material having a heat transfer coefficient approximating that of soda-lime-silica glass, a coefficient of thermal expansion less than that of soda-lime-silica glass (preferably less than half) and a deformation temperature higher than that of soda-lime-silica glass (preferably at least 27° F. or 15° C. higher). The layer of glassy material is supported on a metal frame of outline configuration, preferably of steel, conforming to the outline of the glass sheet to be bent and having an upper edge surface of outline configuration shaped to conform to the shape of the layer of the glassy material. A layer of stretched knit fiber glass cloth is interposed between the upper bearing surface of the layer of glassy material and the lower surface of the sheet of soda-lime-silica glass to be shaped.

According to the method of the present invention, a sheet of soda-lime-silica glass is supported above a layer of a glassy composition having a heat transfer coefficient compatible with that of soda-lime-silica glass, a deformation temperature at least 27° F. (15° C.) higher than that of soda-lime-silica glass and a coefficient of thermal expansion less than half of that of soda-lime-silica glass with a sheet of knit fiber glass cloth held in tension between said layer and said sheet. The layer of glassy composition is supported around its marginal portion on a frame of outline configuration whose upper edge surface conforms to the shape of the layer of glassy composition. The layer of glassy composition has a preferred minimum thickness at least equal to that of the glass sheet, and preferably has a nominal thickness of 6 millimeters (¼ inch) when the glass sheet of soda-lime-silica composition to be shaped has a nominal thickness of about 3 millimeters (⅛ inch).

The layer of glassy composition is in the form of a sheet that is previously shaped by supporting the layer over a ceramic pan mold and heating the assembly so formed to a temperature above the deformation temperature of said glassy composition which is sufficient to sag the layer onto the ceramic pan mold to prepare the layer for use in the sag bending operation for soda-lime-silica glass.

Once the layer of said special glassy composition is formed to the shape of the ceramic pan mold, it is mounted on the metal frame of outline configuration whose shape it matches, and, once applied to a metal frame for glass sheet shaping, it is not heated above the deformation temperature for said glassy composition. Therefore, it retains its shape during the shaping of a flat sheet of soda-lime-silica glass into conformity therewith. Should the temperature control in the bending lehr be lost, it is a simple matter to reapply the layer of special glassy composition onto the ceramic pan mold whenever it loses its desired shape and reshape it by heating to elevated temperature necessary to shape the layer of special glassy composition to conform to that of the ceramic pan mold.

It is understood that the difference needed in deformation temperature between the soda-lime-silica glass sheet to be shaped and the special glassy composition that provides the shaping surface for the special mold used in the present invention is a function of the sharpness of bend to be imparted to the soda-lime-silica glass composition. However, adequate results have been obtained using a layer of a glassy composition of complicated shape on a shaped metal frame to shape a sheet of soda-lime-silica glass to a complicated curvature.

DESCRIPTION OF PREFERRED EMBODIMENT

When a new pattern for a curved window for an automobile is received from an automobile manufacturer, the pattern is provided with an outline of a window marked on the upper curved surface of a model shaped to conform to the inner or outer surface of the curved window. A metal frame (preferably steel) is shaped to provide an upper edge surface conforming to the surface marked on the model and a desired plan outline. The metal frame has a contour and outline that conforms to the shape desired slightly inboard of the periphery of the bent glass sheet, preferably about ¼ inch (6 millimeters), and an elevation conforming to the shape desired along the longitudinal and transverse dimensions of said bent glass sheet. The model with the contour facing upward is enclosed within a peripheral fence of Masonite and a ceramic pan mold is formed on the upward facing contour of the model by casting a liquid ceramic material sold under the trademark PURETAB into the enclosed volume and forming a ceramic replica about 1 inch (2.5 centimeters) thick, according to the prior art method.

A layer of glass or glassy composition having the requisite properties of a low coefficient of thermal expansion, a heat transfer coefficient approximating that of soda-lime-silica glass and a deformation temperature or annealing point sufficiently higher than that of soda-lime-silica glass to enable a sheet of soda-lime-silica glass to be sagged to conform to the shape of the upper surface of a layer of said special glassy composition without affecting the shape of said layer is mounted on the ceramic pan mold and conformed to the shape of the ceramic pan mold using whatever time and temperature is necessary for heating the layer to sag the latter into conformity with the ceramic pan mold. A slow rate of heating is used to insure full conformance of the layer of special glassy composition with the ceramic pan mold. Once the layer conforms to the ceramic pan mold, the assembly is subjected to cooling to maintain its shape conforming to the ceramic pan mold.

The layer of special glassy composition, having a shape conforming to that of the ceramic pan mold, is supported on the upper edge surface of the metal frame and a layer of a knit fiber glass cloth, preferably of the type used to cover press bending molds that is described in U.S. Pat. No. 3,148,968 to Cypher and Valchar, is superimposed in stretched relation over the layer of special glassy composition. The glass sheet of soda-lime-silica glass is mounted over the layer of knit fiber glass cloth.

The outline metal frame laden with the layer of glassy composition, the knit fiber glass cloth and the unbent glass sheet is then inserted in an elongated tunnel-like heating lehr and heated for about 10½ minutes while exposed to the lehr atmosphere to reach a maximum temperature of about 1150° to 1180° F. (which conforms to approximately 622° to 639° C.). While exposed to this heating, the special glassy composition retains its shape while the sheet of soda-lime-silica glass sags by gravity to conform to the shape of the special glassy composition. It is noted in passing that the heating cycle of 10½ minutes is of the same order of magnitude as the conventional heating cycle used in a mass production bending lehr.

The stretched knit fiber glass cloth interposed between the upper surface of the layer of special glassy composition and the lower surface of the soda-lime-silica glass sheet avoids fusion of the soda-lime-silica glass sheet to the glassy layer and permits ready removal of the shaped soda-lime-silica glass sheet from the supporting layer of special glassy composition. Furthermore, the layer of stretched knit fiber glass clotch selectively receives any glass chips or small dust particles that would otherwise penetrate the major surface of the heat softened soda-lime-silica glass sheet and cause a defect known as bulls-eyes.

The use of fiber glass cloth insulates the glass sheet to be shaped from the layer of special glassy composition that supports the shaped glass. In conventional bending lehrs, the majority of heat is radiated downward from the roof. Thus, the presence of a layer of fiber glass cloth tends to insulate the supporting layer of special glassy composition from the main heat source and would provide a source of glass breakage. However, when the special glassy composition has a low coefficient of thermal expansion, stresses resulting from temperature differentials are less than with higher expansion glasses so that the chance of the layer of special glassy composition fracturing during the shaping operation when its temperature varies less than that of the soda-lime-silica glass sheet is reduced considerably because of the low thermal expansion coefficient of the glassy composition. This breakage is attributed to high thermal stresses established in the lower sheet when the assembly is heated and/or cooled rapidly during a shaping operation. These stresses are also reduced by heating and cooling the glass sheets at a slower rate, but such slower rate involves inefficient use of existing glass sheet bending lehrs.

Unless care is taken to remove from the bending lehr all dust and glass particles that may enter between a pair of glass sheets mounted for bending in pairs, only one sheet of soda-lime-silica glass is bent at a time. This precaution is taken because of the change of forming bulls-eyes when glass sheets are bent in pairs. Interposing a second layer of fiber glass between two glass sheets bent in pairs may result in breaking the lower sheet when the pair is bent at conventional mass production rates.

Any means to tension the knit fiber glass cloth is suitable. Preferably, the knit fiber glass cloth is held in place by a plurality of weighted hooks disposed around the periphery of the metal frame. Such an arrangement provides enough tension to the fiber glass cloth to prevent it from wrinkling. There is enough stretch in the fiber glass cloth to enable it to move and conform to the contour of the upper surface of the glassy composition layer as the softened sheet of soda-lime-silica glass sags onto the upper major surface of the glassy composition layer during heating. The fiber glass cloth acts as a parting agent between the layer of special glassy composition and the sheet of soda-lime-silica glass to prevent fusion between the shaped layer of glassy composition and the sagged sheet of soda-lime-silica glass and surface marking or surface damage of the soda-lime-silica sheet by particles supported on the upper surface of the rigid layer of special glassy composition. Furthermore, any dirt particles or glass chips would tend to be received within voids between the strands of knit fiber glass cloth rather than present a raised bump between the layer of special glassy composition and the glass sheet that would cause the optical defect known as a bulls-eye in the softer glass sheet. The knit fiber glass cloth is sufficiently compressive that dirt particles and glass chips are pushed into its interstices rather than project above its surface to cause bulls-eyes.

A typical ceramic pan mold is 1 inch thick (2.54 centimeters) and a ceramic pan mold for a particular pattern for which samples were produced weighed 189 pounds (approximately 86 kilograms). If the ceramic pan mold is used for shaping a sheet of soda-lime-silica glass, it must first be preheated for at least 10 minutes. Then, a sheet of soda-lime-silica glass of the thickness required for the windshield pattern produced (nominal thickness 3/32 inch or 2.4 millimeters) had to be heated for a minimum of 19 minutes on the heated ceramic mold and held on the mold for at least two hours of cooling to avoid breakage or warpage. The glass sheet so shaped had virtually no compression stress along its marginal edge. While such a cycle may be tolerated to produce a component of a glass sheet shaping mold that can be reused to produce shaped glass sheets on a mass production basis at higher speeds of production, if each glass sheet were produced by heat sagging onto a ceramic pan mold, the production cycle would be too slow to be tolerated as it would represent an inefficient use of glass sheet shaping equipment (bending lehrs) already in existence.

In contrast, the present invention limits the relatively slow production of shaping layers of special composition glass against a ceramic pan mold to produce a layer of glassy composition for each composite mold of a complement of molds that is required for a continuous mass production operation of making shaped glass sheets of complicated shapes. After each layer of special glassy composition is shaped, it is mounted on a shaped metal frame of corresponding curvature and similar outline and a layer of knit fiber glass cloth stretched over the upper surface of the layer of glassy composition. A sheet of soda-lime-silica glass of the requisite thickness (3/32 inch equivalent to 2.4 millimeters) for the window of complicated shape is mounted on the composite mold according to the present invention. In a preferred embodiment of mold according to this invention, the outline, shaped metal frame is about ⅛ inch (3 millimeters) thick and 1½ inch (38 millimeters) high, the preshaped layer of glassy composition over said frame is about ¼ inch (6 millimeters) thick and the layer of knit fiber glass cloth stretched over said preshaped layer is about 40 mils (about 1 millimeter) thick. The outline of the metal frame was slightly smaller than the outline of the glass sheet. A 10½ minute heating cycle caused the glass sheet to attain a maximum temperature of 1150° to 1180° F. (622° to 639° C.) when it sagged completely onto the upper surface of said layer of special glassy composition of said mold. A 17 minute cooling cycle for annealing the shaped glass sheet with the latter remaining on the mold during said cooling developed a desirable stress pattern of compression stress along the edge portion and a smaller tension stress inwardly of the edge. Additional sheets of soda-lime-silica glass were then shaped using the composite mold comprising the same mold components as for the first heating and cooling cycle repeating the relatively rapid heating and cooling cycles approximating those used in standard production gravity sagging with outline metal molds rather than the slower heating and cooling cycle needed when using ceramic pan molds.

Sample windshields of a complicated pattern or future automobiles have been produced according to the present invention. This pattern comprised an arcuate shape in the longitudinal dimension and an S-curve of varying curvature in cross section. Attempts to bend this pattern on a skeleton-type iron bending mold of the prior art generally used for sag bending are not practical, principally because of the difficulty in controlling the shape within the supported outline.

When glass sheets are bent by gravity sagging and annealed on ceramic pan molds, they do not develop a desired stress pattern in their marginal edge portion, and the time needed for heating and cooling is too long for efficient production. However, when supported over skeleton metal molds of the outline type that engage the shaped glass near its marginal edge portion, the marginal edge of the shaped glass develops a compression stress and the portion of the glass inward of the marginal edge that is aligned with the supporting metal mold develops a tension stress that is encompassed within the compression layer along the edge of the shaped glass. The presence in the composite mold of the layer of special glassy composition and of the knit fiber glass cloth does not have a significant effect on the desired stress pattern for the edge of the glass sheet of soda-lime-silica composition to be shaped. In other words, while a ceramic pan mold of a ceramic material having high thermal capacity inhibits the formation of a stress pattern in the marginal edge portion of a shaped glass sheet, the combination of an outline metal frame of high heat capacity and a layer of glassy composition having a higher deformation temperature and a heat capacity approximating that of soda-lime-silica glass develops an adequate stress pattern in the marginal portion of the bent glass commensurate with what one expects from bending glass in direct contact with an outline mold by gravity sagging.

Pairs of glass sheets of soda-lime-silica composition shaped to the complicated pattern comprising an arcuate shape of concave elevation in the longitudinal dimension and an elongated S-curve in cross section by gravity sag bending on a mold conforming to the present invention have been laminated together using plasticized polyvinyl butyral sheets having a thickness of 30 mils (0.76 millimeter) using a technique depicted in U.S. Pat. No. 2,968,645 to Keim. It is understood that bends of greater complexity may require the shaping of individual glass sheets to slightly different configurations in order to provide perfect matching of the two glass sheets to opposite sides of a layer of interlayer material to form the final laminated shape.

One of the benefits of the present invention is that the layer of special glassy composition may be used over and over again in conjunction with the outline metal frame on which the layer of special glassy composition is mounted to form a composite bending mold. The layer of glassy composition is not a waste plate that must be replaced each time another sheet of glass is bent, but forms part of a mold to be reused to make many shaped glass sheets.

The special glassy composition can be any composition having a heat capacity less than that of the outline metal frame, and preferably one approximating that of commercial float glass of soda-lime-silica composition. It is also preferred that the layer of special glassy composition have a deformation temperature higher than that of soda-lime-silica glass and a coefficient of thermal expansion that is less than that of soda-lime-silica glass, preferably less than half that of commercial float glass of soda-lime-silica composition.

For relatively shallow depths of bend, the layer of glassy material may be a borosilicate glass of the type referred to as Pyrex glass having a deformation temperature (which for the purpose of the present invention is equivalent to the annealing point wherein the glass has a log viscosity equal to 13.0) is 1049° F. (565° C.) compared to a range of 1015° to 1020° F. (546° to 549° C.) for commercial composition of soda-lime-silica type of float glass. A typical illustrative example of a Pyrex glass is:

| Ingredient | Parts by Weight |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 |

Such a borosilicate glass has a coefficient of thermal expansion of $3.2 \times 10^{-6}$ per ° C. compared to an expansion coefficient of $8.8 \times 10^{-6}$ per ° C. for commercial float glass of soda-lime-silica composition.

For a more complicated shape, a more suitable layer is the following glassy composition having a deformation temperature (or annealing point) of 1110° F. (599° C.) and a coefficient of thermal expansion of $3.9 \times 10^{-6}$ per ° C. A typical glassy composition contains the following ingredients by weight:

| Ingredient | Parts by Weight |
|---|---|
| $SiO_2$ | 70.31 |
| $Na_2O$ | .27 |
| $Li_2O$ | 4.15 |
| F | .24 |
| $Al_2O_3$ | 19.07 |
| $ZrO_2$ | 1.46 |
| ZnO | 1.67 |
| $Fe_2O_3$ | .046 |
| $TiO_2$ | 2.14 |
| $K_2O$ | .28 |
| $Sb_2O_5$ | .36 |

When the latter composition is crystallized, its coefficient of thermal expansion becomes $-3.6 \times 10^{-7}$ per ° C. and its deformation temperature increases to 1260° F. (682° C.). A composite mold with a shaped layer of a glassy composition having a higher deformation temperature enables one to heat the sheet of soda-lime-silica glass to a higher temperature than what is developed for gravity sag bending on outline metal molds or composite molds with a shaped layer of a glassy composition having a deformation temperature closer to that of the glass sheet to be shaped. Hence, the shaped layer of higher deformation temperature retains its shape when the glass sheet-laden composite mold is heated to a temperature higher than that of its deformation temperature to provide a greater degree of sagging in a given time or a shorter time requirement to sag the glass sheet into conformity with the upper surface of the shaped layer of special glass composition.

This description represents a preferred embodiment of the present invention and a modification thereof. It is understood that many variations may be made without departing from the gist of the present invention as defined in the claimed subject matter that follows.

We claim:

1. A reusable mold for shaping glass sheets of soda-lime-silica composition by gravity sag bending to a complicated shape including a portion of concave elevation and a portion of convex elevation, comprising a rigid preformed sheet of a glassy composition having a lower coefficient of thermal expansion than soda-lime-silica glass, a heat capacity approximating that of soda-lime-silica glass and a deformation temperature at least 27° F. (15° C.) higher than the deformation temperature of soda-lime-silica glass and an upper major surface conforming to said complicated shape, a rigid metal frame of outline configuration having an upper edge surface conforming in elevation and outline to the shape of said sheet of glassy material disposed in supporting relation to said sheet, said sheet being substantially coextensive with the total area within said metal outline frame.

2. A reusable mold as in claim 1, further including a layer of knit fiber glass cloth held in stretched relation against the upper surface of said sheet of glassy composition.

3. A method of shaping a glass sheet of soda-lime-silica composition to a complicated curvature having a portion of concave elevation and a portion of convex elevation by gravity sag bending comprising forming an assembly by supporting said soda-lime-silica sheet over a rigid preformed sheet of glassy composition having a lower coefficient of thermal expansion than said soda-lime-silica glass, a heat capacity approximating that of soda-lime-silica glass, a deformation temperature at least 27° F. (15° C.) higher than the deformation temperature of soda-lime-silica glass and an upper major surface conforming to said complicated shape and substantially coextensive with the area of said soda-lime-silica sheet, supporting said layer of glassy composition on a rigid metal frame of outline configuration having an upper edge surface conforming in elevation and outline to the shape of said rigid preformed sheet of glassy composition and a heat capacity per unit volume greater than that of said sheet of glassy composition, heating said assembly so formed to an elevated temperature at least equal to the deformation temperature of said soda-lime-silica glass sheet and below the deformation temperature of said sheet of glassy material until said soda-lime-silica sheet sags to conform to the complicated shape of said preformed sheet of said glassy composition, and cooling said assembly at a rate sufficiently rapid to impart a zone of compression stress around the marginal edge of said soda-lime-silica glass sheet and a zone of tension stress along a zone inward of said marginal edge approximately in alignment with said metal frame during said heating and cooling.

4. A method as in claim 3, wherein said assembly is formed with a layer of stretched knit fiber glass fabric interposed between said glass sheet to be shaped and said rigid preformed sheet of glassy composition.

5. A method as in claim 4, wherein said rigid preformed sheet of glassy composition is reused in the shaping by gravity sagging of additional glass sheets of soda-lime-silica composition.

6. A method as in claim 4, wherein said rigid preformed sheet of glassy composition has a minimum thickness at least equal to the thickness of said soda-lime-silica glass sheet.

* * * * *